United States Patent
Aggarwal

(10) Patent No.: US 8,358,694 B2
(45) Date of Patent: Jan. 22, 2013

(54) EFFECTIVE ERROR CONCEALMENT IN REAL-WORLD TRANSMISSION ENVIRONMENT

(75) Inventor: Gaurav Aggarwal, Andover, MA (US)

(73) Assignee: Broadcom Corporation, Irvine, CA (US)

(*) Notice: Subject to any disclaimer, the term of this patent is extended or adjusted under 35 U.S.C. 154(b) by 594 days.

(21) Appl. No.: 12/582,423

(22) Filed: Oct. 20, 2009

(65) Prior Publication Data

US 2011/0090962 A1    Apr. 21, 2011

(51) Int. Cl.
*H04N 7/12* (2006.01)

(52) U.S. Cl. ......... 375/240.15; 375/240.16; 375/240.01; 725/93; 725/94

(58) Field of Classification Search ............. 375/240.15, 375/240.16, 240.01; 725/93, 94
See application file for complete search history.

(56) References Cited

U.S. PATENT DOCUMENTS

| 2009/0323820 A1* | 12/2009 | Wu et al. ............ 375/240.25 |
| 2009/0323826 A1* | 12/2009 | Wu et al. ............ 375/240.27 |

* cited by examiner

*Primary Examiner* — Sath V Perungavoor
*Assistant Examiner* — Geepy Pe
(74) *Attorney, Agent, or Firm* — Brinks Hofer Gilson & Lione

(57) ABSTRACT

Systems, methods, and apparatuses are provided for concealing errors in video data. It is detected whether a slice group in a picture contains errors. When the slice group contains errors and the picture is not a first intra-picture following a channel change, the slice group in the picture is replaced with a slice group of a most recent intra-coded picture. When the slice group contains errors and the picture is the first intra-picture following the channel change, the slice group is replaced with black pixels.

20 Claims, 7 Drawing Sheets mv   fo......fn mv   Fo...Fm

Co ....Ci-1 ...Cj, Cj+1

EFFECTIVE ERROR CONCEALMENT IN REAL-WORLD TRANSMISSION ENVIRONMENT

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In systems such as video systems where video streams get transmitted from the encoding side to the decoding side, transmission errors such as random bit errors or packet loss, or storage errors such as disk defects, may cause damage to compressed video bit streams presented to a digital video decoder. Because of the nature of modern video compression techniques, such errors can render the decoded video output very objectionable or useless to the human observer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in system(s) and method(s) for effective error concealment in real-world video transmission environments, as illustrated or described in one or more of the following drawings and/or detailed description, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
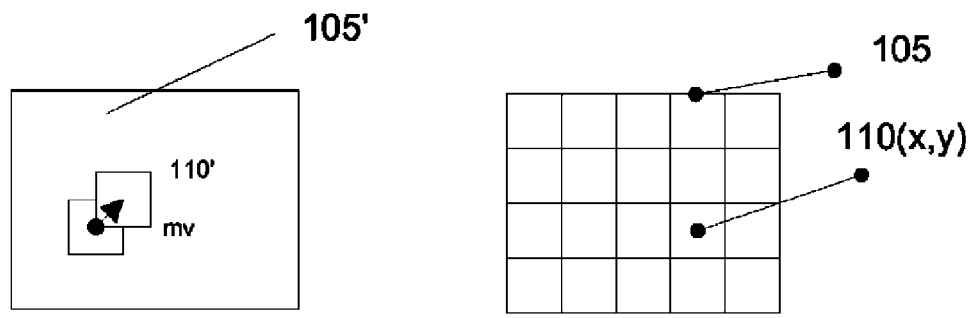
FIG. 1 is a block diagram describing error concealment in accordance with an embodiment of the present invention.
Figure 1:
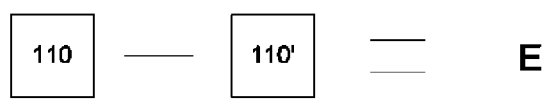
Figure 1:
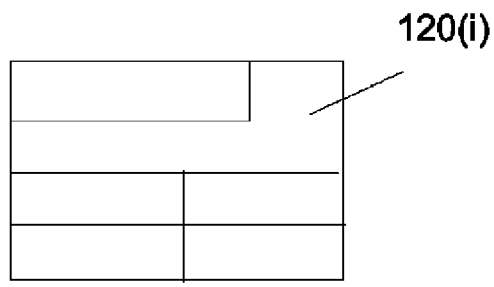

Referring now to FIG. 1, there is illustrated a block diagram describing the error concealment of an exemplary picture 100 in accordance with an embodiment of the present invention. The picture 100 comprises a stream of symbols. The symbols together represent a compressed representation of a field/frame of a video sequence. The picture 100 can be received, either from a communication network or from a memory.

A frame 105 can be compressed using a variety of techniques. For example, the frame 105 can be divided into pixel blocks 110(x,y). Instead of representing each pixel in each pixel block 110, the pixel block 110 can be compared to regions of other frames 105. Since motion picture uses at least 24 frames/second, it is likely that frames that are contemporaneous with respect to each other have similar content that differs primarily by movement. Thus, for a given block 110 (x,y), a contemporaneous frame 105' can be searched to find a similar appearing block 110' (known as a reference block). It is noted that the reference block is not necessarily aligned with the blocks boundaries of frame 105. The blocks 110 of the picture 100 can either not be predicted from another picture (known as an intra-picture), predicted from one picture, or predicted from two pictures.

Accordingly, blocks 110(x,y) can be represented as the pixel by prediction error E between their reference blocks 110', and an identification of the similar appearing blocks 110' (if they are predicted at all). The reference blocks are identified by what is known as a motion vector my that describes the spatial displacement between the block 110 and the similar appearing blocks 110'. The prediction error E subjected to mathematical transformations, such as a Discrete Cosine Transformation, or the Hadamard Transformation, resulting in coefficients, $f_0 \ldots f_n$ in another domain, such as frequency. The coefficients $f_0 \ldots f_n$ in the another domain can be quantized, resulting in quantized coefficients $F_0 \ldots F_m$. It is noted that quantization may result in truncating some of the coefficients to zero (particularly coefficients representing higher frequencies), resulting fewer quantized coefficients, m<n.

The mv and the quantized coefficients F are symbols $S_0$ that are then losslessly encoded using a variable length code, such as a Context Adaptive Binary Arithmetic Coding (CABAC), or Context Adaptive Variable Length Coding (CAVLC). In a variable length code, fewer bits are assigned to more frequently occurring symbols while more bits are assigned to less frequency occurring symbols. However, in variable length coding, the frequency of symbol occurrence is predetermined prior to coding, and may not actually reflect the actual frequency of symbol occurrence in the present stream of data. In CABAC and CAVLC, the frequency of symbol occurrence is observed dynamically during coding, and codes can be changed based on dynamic changes in frequency of occurrence. A context model is maintained to monitor the actual frequency of symbols occurrence and change codes dynamically.

As a result, in CABAC and CAVLC, decoding a code $C_i$ is data depending on each of the preceding codes $C_0 \ldots C_{i-1}$ in order to regenerate the context model and code maps. However, if during transmission, bit errors occur that cannot be corrected by forward error correction, some of the symbols $C_0 \ldots C_{i-1}$, e.g., $C_j$ will be incorrect. As a result of this, the following symbols $C_{j+1} \ldots$ can be potentially decoded using an incorrect context model. This error can continue to propagate for all the remaining symbols $C_{j+1} \ldots$.

To block, for example, the foregoing error propagation, the symbols are coded in units 120, where at the beginning of the unit, the context model is reset. The units 120 can comprise a group of blocks 110 in the picture 100. Although the blocks 110 in the units are shown to be spatially contiguous, it is noted that the units do not necessarily have to be spatially contiguous. As a result, if bit errors corrupt the symbols of unit 120(i), the decoding of the symbols of unit 120(i+1) are unaffected.

However, although bit errors propagation confines errors in the decoding of the symbols to the unit 120, prediction errors can propagate to other pictures 100. If for example, a later picture has block that use blocks that lie at least partially in the corrupted unit, while the prediction error E and the motion vector mv of the block may be properly decoded, the reference block 105' may be corrupted, or altogether unavailable. As a result, while symbols errors are confined to units 120, prediction errors can propagate to other pictures.

Accordingly, when a unit 120 of a picture 100 is detected to contain errors of be corrupted, the unit 120 is "filled in". The unit 120 in the picture 100 is filled in with the co-located regions of the most recent intra-picture, irrespective of whether the picture 100 actually uses any blocks of the intra-picture as reference blocks.

A special case occurs if the picture 100 is the first picture in a video sequence, there are no prior pictures to use. In the case where a video sequence follows a channel change, the "prior pictures" will be the last pictures of the previous channel. Using the last picture of the previous channel to fill in the corrupted unit 120, would result in artifacts from the previous channel. This is particularly objectionable in appearance. Accordingly, in the case of a first intra-picture with a corrupted unit 120, the corrupted unit 120 is blacked out.

Figure 2:
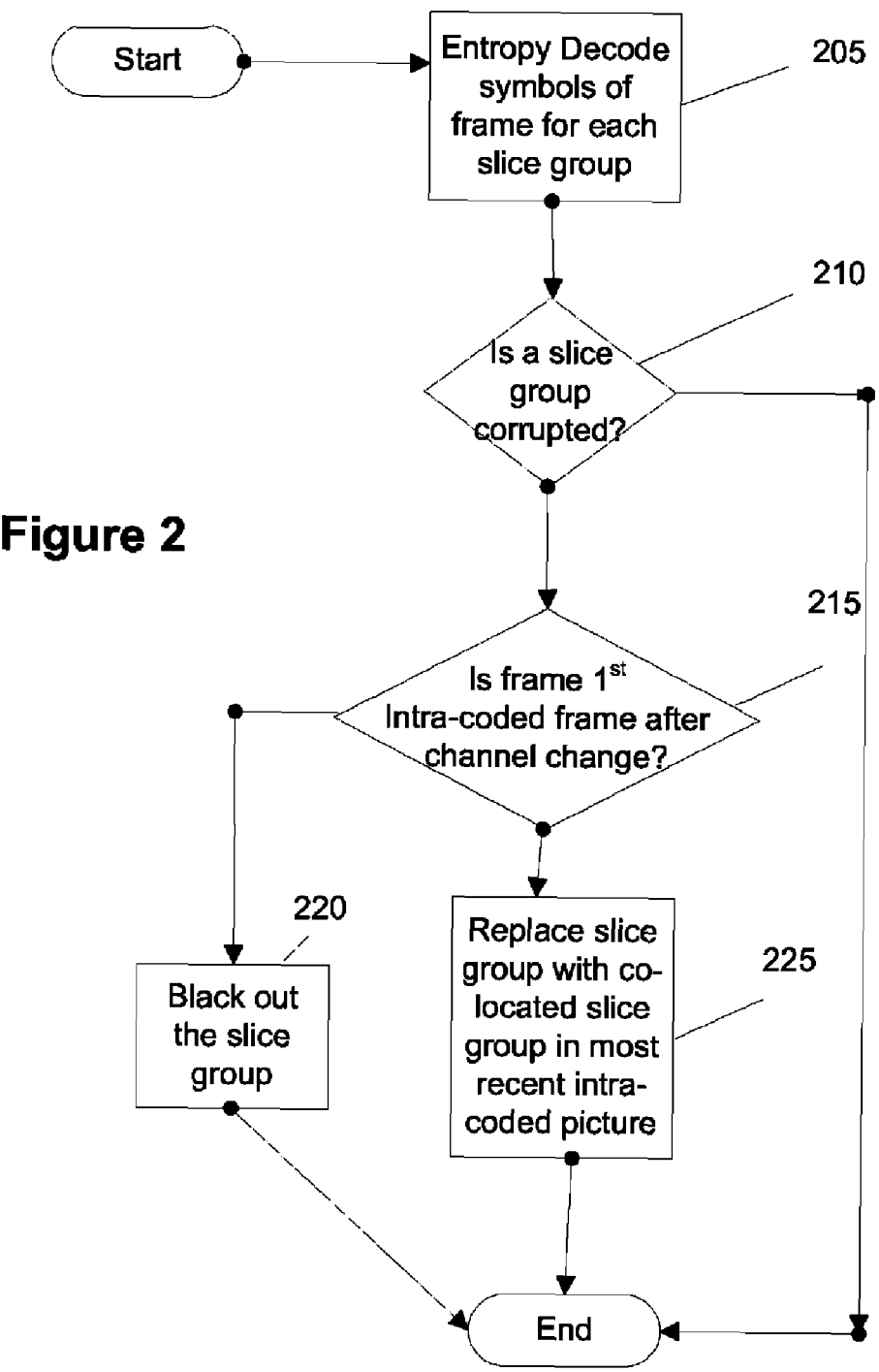
FIG. 2 is a flow diagram for decoding video data in accordance with an embodiment of the present invention.

Referring now to FIG. 2, there is illustrated flow diagram describing a method for decoding video data in accordance with an embodiment of the present invention. At 200, a picture 100 is received from either a communication channel or a memory. At 205, symbols of the picture 100 are decoded for each unit 120. If at 210, any units 120 are found to be corrupted, a determination is made whether the picture 100 is a first intra-coded picture of a video sequence. If the picture 100 is a first intra-coded picture of a video sequence at 215, the corrupted units 120 are blacked out 220. Otherwise, the corrupted units 120 are filled in with the co-located regions in the most recent intra-picture at 225.

The present invention will now be described in the context of an exemplary video compression scheme, known as Advanced Video Coding (AVC), also known as MPEG-4, Part 10, and H.264.

Figure 3A:
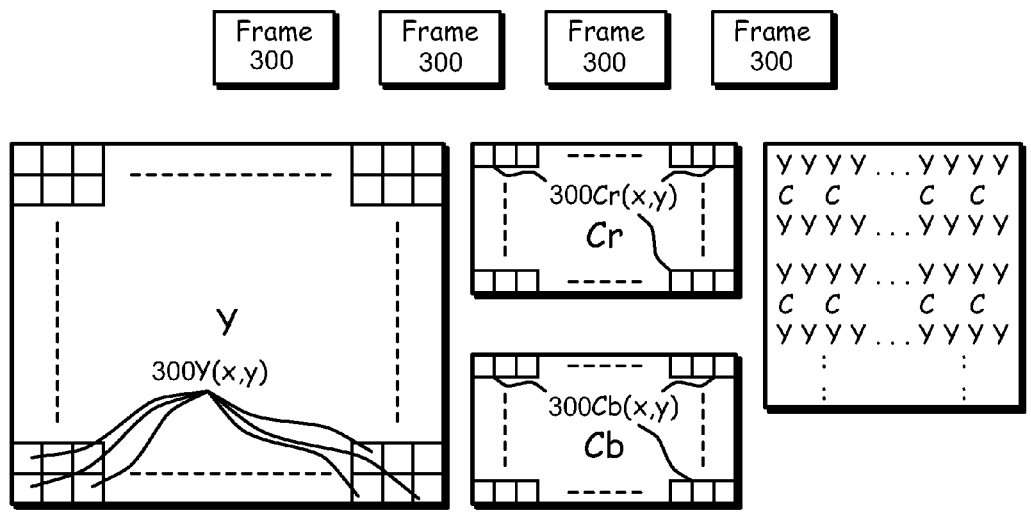
FIG. 3A-3C are block diagrams describing an embodiment of the present invention in the context of H.264.
Figure 3A:
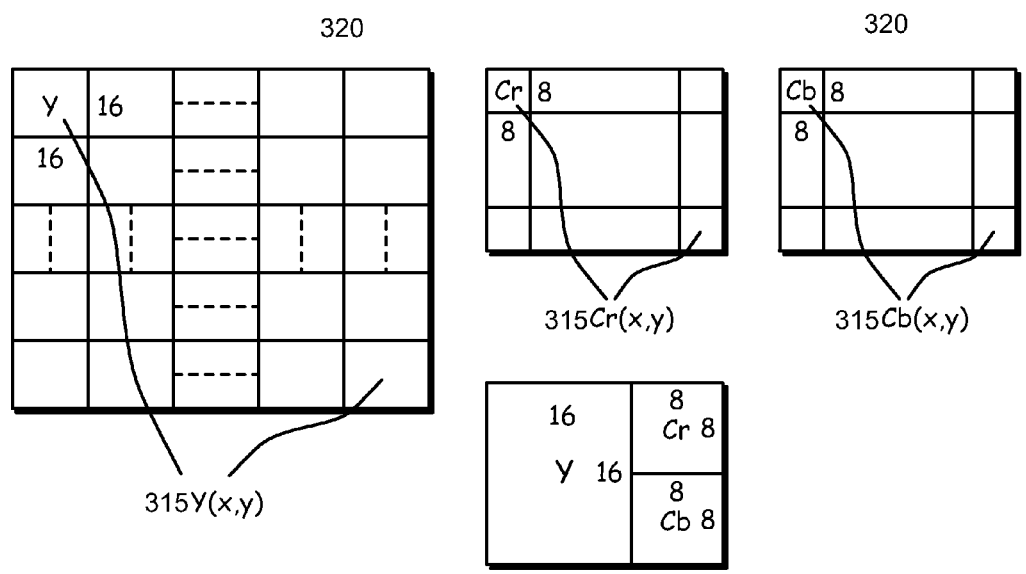

Referring now to FIG. 3A, there is illustrated a block diagram describing encoding of video data in accordance with AVC. A video camera captures frames 300 from a field of view during time periods known as frame durations. The successive frames 300 form a video sequence. A frame 300 comprises two-dimensional grid(s) of pixels 300(x,y).

For color video, each color component is associated with a two-dimensional grid of pixels. For example, a video can include a luma, chroma red, and chroma blue components. Accordingly, the luma, chroma red, and chroma blue components are associated with a two-dimensional grid of pixels 300Y(x,y), 300Cr(x,y), and 300Cb(x,y), respectively. When the grids of two dimensional pixels 300Y(x,y), 300Cr(x,y), and 300Cb(x,y) from the frame are overlayed on a display device 310, the result is a picture of the field of view at the frame duration that the frame was captured.

The chroma red 300Cr(x,y) and chroma blue 300Cb(x,y) pixels are overlayed the luma pixels in each even-numbered column 300Y(x, 2y) between each even, one-half a pixel below each even-numbered line 300Y(2x, y). In other words, the chroma red and chroma blue pixels 300Cr(x,y) and 300Cb (x,y) are overlayed pixels 300Y(2x+½, 2y).

Four 8×8 blocks of luma pixels 315Y(x,y), and co-located 8×8 blocks of chroma red pixels 315Cr(x,y) and chroma blue pixels 315Cb(x,y) are coded together forming what is collectively known as a macroblock 320.

The H.264 standard encodes video on a frame by frame basis, and encodes frames on a macroblock by macroblock basis. H.264 specifies the use of temporal prediction, transformation, and lossless entropy coding to compress the macroblocks 320, among other compression techniques.

Figure 3B:
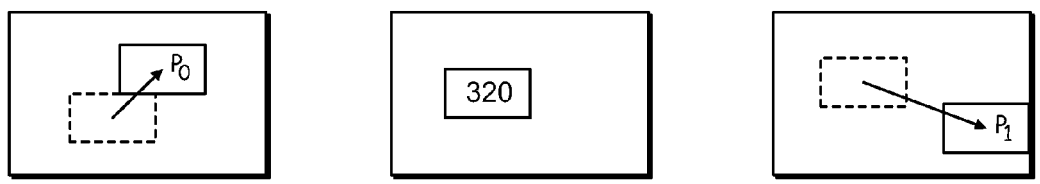
Figure 3B:
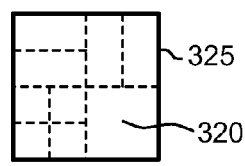

Referring now to FIG. 3B, there is illustrated a block diagram describing temporally encoded macroblocks 320. Each macroblock 320 is compared to the pixels of other frames or fields for a similar block of pixels P. A macroblock 320 is encoded as a prediction error E between the block of pixels P and the macroblock 320.

The similar block of pixels is known as the prediction pixels P. The difference between the macroblock and the prediction pixels P is known as the prediction error E. The prediction error E is calculated and encoded, along with an identification of the prediction pixels P. The prediction pixels P are identified by motion vectors MV. Motion vectors MV describe the spatial displacement between the macroblock 320 and the prediction pixels P.

The macroblock 320 can be predicted from blocks of pixels P in either one frame, two frames, or not predicted from blocks of pixels P from another frame. In bi-directional coding, the partition can be predicted from two weighted blocks of pixels, P0 and P1. Accordingly, a prediction error E is calculated as the difference between the weighted average of the prediction blocks w0P0+w1P1. The prediction error E, an identification of the prediction blocks P0, P1 are encoded. The prediction blocks P0 and P1 are identified by motion vectors MV.

Figure 3C:
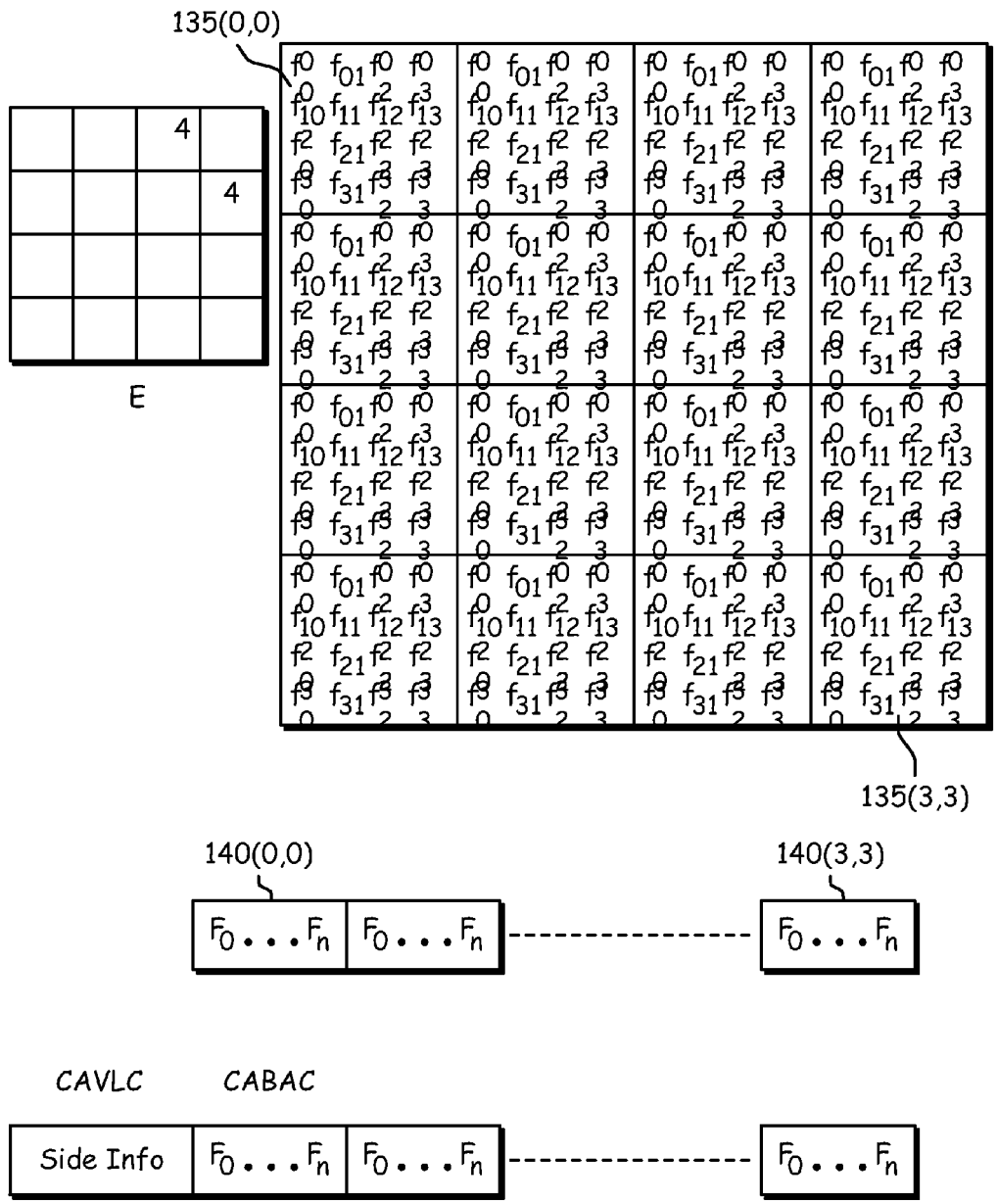

Referring now to FIG. 3C, there is illustrated a block diagram describing the encoding of the prediction error E. The prediction error E is also two-dimensional grid of pixel values for the luma Y, chroma red Cr, and chroma blue Cb components with the same dimensions as the macroblock 320.

A transformation transforms the prediction error E to the frequency domain, thereby resulting in corresponding sets 135 of frequency coefficients $f_0 \ldots f_n$. The sets 135 of frequency coefficients are then quantized and scanned, resulting in sets 140 of quantized frequency coefficients, $F_0 \ldots F_m$. The macroblocks 320 are represented by a prediction error E that is encoded as sets 140 of quantized frequency coefficients $F_0 \ldots F_n$. The macroblock 320 is represented by side information, such as prediction mode indicators, and identification of prediction blocks.

Context Adaptive Variable Length Coding (CAVLC) is used to encode the frequency coefficients $F_0 \ldots F_n$. Context Adaptive Binary Arithmetic Coding (CABAC) is used to encode the side information. In CABAC coding, the information is first transformed to what is known as CABAC Binary Symbols (bins). The bins are then transformed to CABAC symbols.

The mv and the quantized coefficients F are symbols that are then losslessly encoded using a variable length code, such as a Context Adaptive Binary Arithmetic Coding (CABAC), or Context Adaptive Variable Length Coding (CAVLC), thereby resulting in codes $C_0 \ldots$. In a variable length code, fewer bits are assigned to more frequently occurring symbols while more bits are assigned to less frequency occurring symbols. However, in variable length coding, the frequency of symbol occurrence is predetermined prior to coding, and may not actually reflect the actual frequency of symbol occurrence in the present stream of data. In CABAC and CAVLC, the frequency of symbol occurrence is observed dynamically during coding, and codes can be changed based on dynamic changes in frequency of occurrence. A context model is maintained to monitor the actual frequency of symbols occurrence and change codes dynamically.

As a result, in CABAC and CAVLC, coding of a given symbol is data dependent on the context model and code maps resulting each of the preceding codes symbols. However, if during transmission, bit errors occur in a code, e.g., $C_j$ that cannot be corrected by forward error correction, the context model and code maps may not be regenerated correctly. As a result of this, the following codes can be potentially decoded using an incorrect context model. This error can continue to propagate for all the remaining symbols $C_{j+1}$ . . . .

To block the foregoing error propagation, the macroblocks 320 are grouped into units known as slice groups 325, as shown in FIG. 3B, wherein at the beginning of the unit, the context model is reset. Although the macroblocks 320 in the slice groups 325 are shown to be spatially contiguous, it is noted that the units do not necessarily have to be spatially contiguous. If bit errors corrupt the symbols of slice group 325($i$) the decoding of the symbols of unit 320($i$+1) are unaffected.

However, although slice groups confine bit errors in the decoding of the symbols, e.g., the frequency coefficients, motion vectors, and other side information, to the slice group 325, prediction errors can propagate to other pictures 300. If for example, a later picture has block that use blocks P that lie at least partially in the corrupted unit, while the prediction error E and the motion vector mv of the block may be properly decoded, the reference block P may be corrupted, or altogether unavailable. As a result, while symbols errors are confined to slice groups 325, prediction errors can propagate to other pictures.

The video sequence is encoded as the frame forming it. The encoded video sequence is known as a video elementary stream. The video elementary stream is a bitstream that can be transmitted over a communication network to a decoder. Transmission of the bitstream instead of the video sequence consumes substantially less bandwidth.

Figure 4:
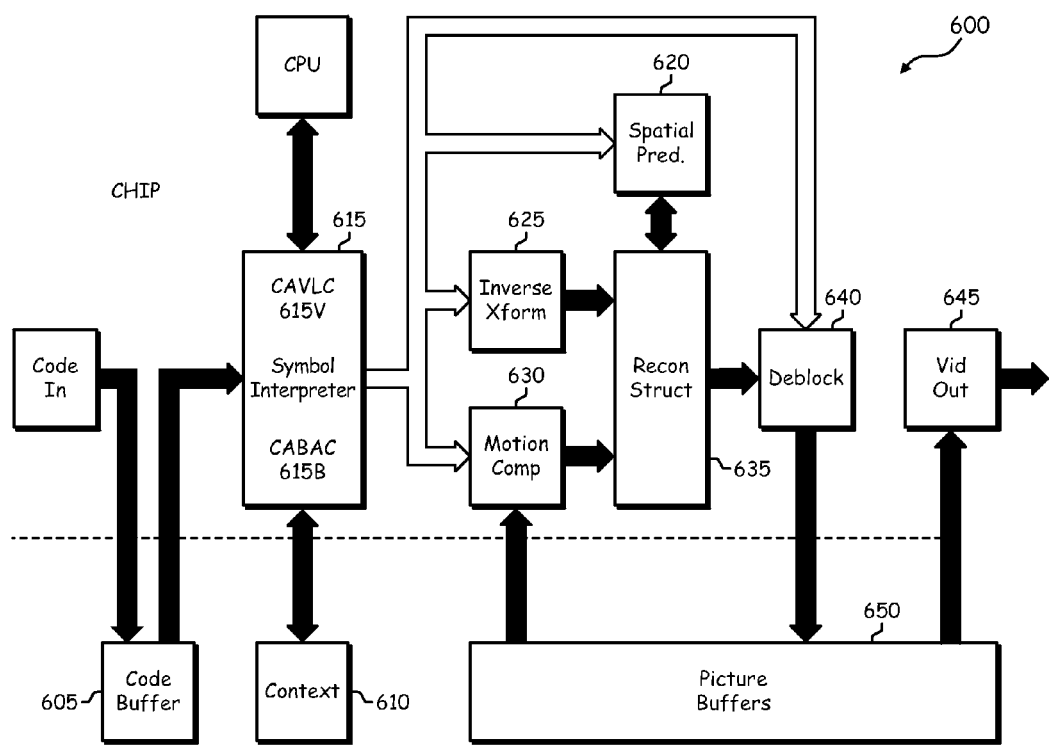
FIG. 4 is a block diagram of an exemplary video decoder in accordance with an embodiment of the present invention.

Referring now to FIG. 4, there is illustrated a block diagram describing an exemplary video decoder 600 in accordance with an embodiment of the present invention. The video decoder 600 includes a code buffer 605 for receiving a video elementary stream. The code buffer 605 can be a portion of a memory system, such as a dynamic random access memory (DRAM). A symbol interpreter 615 in conjunction with a context memory 610 decodes the CABAC and CAVLC symbols from the bitstream. The context memory 610 can be another portion of the same memory system as the code buffer 605, or a portion of another memory system.

The symbol interpreter 615 includes a CAVLC decoder 615V and a CABAC decoder 615B. The CAVLC decoder 615V decodes CAVLC symbols, resulting in the sets 140 of quantized frequency coefficients $F_0$ . . . $F_n$, as shown in FIG. 3C. The CABAC decoder 615B decodes the CABAC symbols resulting in the side information.

The symbol interpreter 615 provides the sets 140 of scanned quantized frequency coefficients $F_0$ . . . $F_n$ to an inverse scanner, quantizer, and transformer (ISQDCT) 625. Depending on the prediction mode for the macroblock 320 associated with the scanned quantized frequency coefficients $F_0$ . . . $F_n$, the symbol interpreter 615 provides the side information to either a spatial predictor 620 (if spatial prediction) or a motion compensator 630 (if temporal prediction).

The ISQDCT 625 constructs the prediction error E. The spatial predictor 620 generates the prediction pixels P for spatially predicted macroblocks while the motion compensator 630 generates the prediction pixels P, or P0, P1 for temporally predicted macroblocks. The motion compensator 630 retrieves the prediction pixels P, or P0, P1 from picture buffers 650 that store previously frames 300.

A pixel reconstructor 635 receives the prediction error E from the ISQDCT 625, and the prediction pixels from either the motion compensator 630 or spatial predictor 620. The pixel reconstructor 635 reconstructs the macroblock 320 from the foregoing information and provides the macroblock 320 to a deblocker 640. The deblocker 640 smoothes pixels at the edge of the macroblock 120 to prevent the appearance of blocking. The deblocker 640 writes the decoded macroblock 320 to the picture buffer 650. The picture buffer 650 can be a portion of DRAM.

A display engine 645 provides the frames 100 from the picture buffer 650 to a display device. The symbol interpreter 615, the ISQDCT 625, spatial predictor 620, motion compensatory 630, pixel reconstructor 635, and display engine 645 can be hardware accelerators under the control of a central processing unit (CPU).

A compressed video bit stream of codes $C_0$ . . . may be input to the symbol interpreter 615 to extract coded information such as, for example, sequence header, picture header, macro block coding mode, motion vectors, and prediction residual coefficients. The symbol interpreter 615 determines whether a particular slice group 325 has bit errors or is otherwise corrupted.

Accordingly, when the symbol interpreter 615 detects a slice group 325 contains errors or is corrupted, the unit 325 is "filled in". The unit 325 is filled in with the co-located regions of the most recent intra-picture, irrespective of whether the picture actually uses any blocks of the intra-picture as reference blocks.

A special case occurs if the picture 300 is the first picture in a video sequence, there are no prior pictures to use. In the case where a video sequence follows a channel change, the "prior pictures" will be the last pictures of the previous channel. Using the last picture of the previous channel to fill in the slice group 325, would result in artifacts from the previous channel. This is particularly objectionable in appearance. Accordingly, in the case of a first intra-picture with a slice group 325, the slice group 325 is blacked out.

Figure 5:
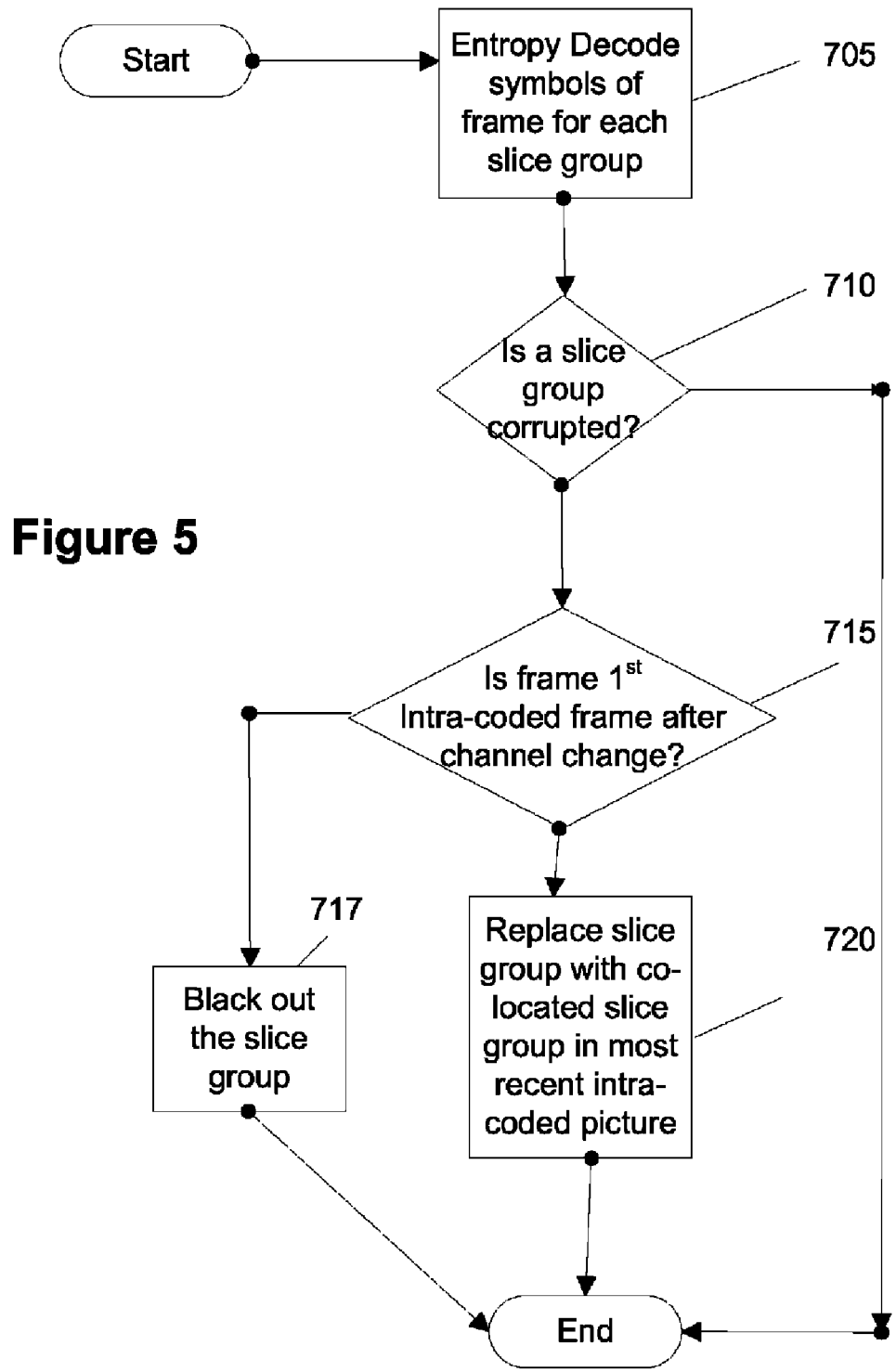
FIG. 5 is a flow diagram for decoding video data in accordance with an embodiment of the present invention.

Referring now to FIG. 5, there is illustrated flow diagram describing a method for decoding video data in accordance with an embodiment of the present invention. At 200, a frame 300 is received from either a communication channel or a memory. At 705, symbols of the frame 300 are entropy decoded for each slice group 325. If at 710, slice group 325 are found to be corrupted, a determination is made whether the frame 300 is a first intra-coded picture of a video sequence. If the frame 300 is a first intra-coded picture of a video sequence at 715, the slice group 325 are blacked out at 717. Otherwise, the slice group 325 are filled in with the co-located regions in the most recent intra-picture at 720.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for concealing errors in video data, the method comprising:
   detecting whether a slice group in a picture contains errors;
   replacing the slice group in the picture with a slice group of a most recent intra-coded picture when the slice group contains errors and the picture is not a first intra-picture following a channel change; and
   replacing the slice group with black pixels when the slice group in the picture contains errors and the picture is the first intra-picture following the channel change.

2. The method according to claim 1 wherein the picture is not predicted from the most recent intra-coded picture.

3. The method according to claim 1 wherein detecting the error in the slice group further comprises detecting errors while entropy decoding.

4. The method according to claim 3 wherein the entropy decoding further comprises Context Adaptive Binary Arithmetic Coding (CABAC).

5. The method according to claim 3, wherein the entropy decoding further comprises Context Adaptive Variable Length Coding (CAVLC).

6. A video decoder for concealing errors in video data, the video decoder comprising:
   a symbol interpreter for detecting whether a slice group in a picture contains errors, for replacing the slice group in the picture with a slice group of a most recent intra-coded picture when the slice group contains errors and the picture is not a first intra-picture following a channel change, and for replacing the slice group with black pixels when the slice group in the picture contains errors and the picture is the first intra-picture following the channel change.

7. The video decoder of claim 6 wherein the picture is not predicted from the most recent intra-coded picture.

8. The video decoder according to claim 6 wherein the symbol interpreter further comprises an entropy decoder.

9. The video decoder according to claim 8 wherein the entropy decoder further comprises a Context Adaptive Binary Arithmetic Coding (CABAC) decoder.

10. The video decoder according to claim 8, wherein the entropy decoder further comprises a Context Adaptive Variable Length Coding (CAVLC) decoder.

11. An apparatus for concealing errors in video data, the apparatus comprising:
    an integrated circuit, said integrated circuit comprising:
    an symbol interpreter operable to detect whether a slice group in a picture contains errors and replace the slice group in the picture with a slice group of a most recent intra-coded picture when the slice group contains errors and the picture is not a first intra-picture following a channel change, the symbol interpreter further operable to replace the slice group with black pixels when the slice group in the picture contains errors and the picture is the first intra-picture following the channel change.

12. The apparatus of claim 11 wherein the picture is not predicted from the most recent intra-coded picture.

13. The apparatus according to claim 11 wherein the symbol interpreter further comprises an entropy decoder.

14. The apparatus according to claim 13 wherein the entropy decoder further comprises a Context Adaptive Binary Arithmetic Coding (CABAC) decoder.

15. The apparatus according to claim 13, wherein the entropy decoder further comprises a Context Adaptive Variable Length Coding (CAVLC) decoder.

16. A method for concealing errors in video data, the method comprising:
    detecting whether a slice group in a picture contains errors;
    replacing the slice group in the picture with a slice group of a most recent intra-coded picture when the slice group contains errors and the picture is not a first intra-picture in a video sequence; and
    replacing the slice group with black pixels when the slice group in the picture contains errors and the picture is the first intra-picture in the video sequence.

17. The method according to claim 1 wherein the picture is not predicted from the most recent intra-coded picture.

18. The method according to claim 1 wherein detecting the error in the slice group further comprises detecting errors while entropy decoding.

19. The method according to claim 3 wherein the entropy decoding further comprises Context Adaptive Binary Arithmetic Coding (CABAC).

20. The method according to claim 3, wherein the entropy decoding further comprises Context Adaptive Variable Length Coding (CAVLC).

* * * * *